J. EPPLER.
SAUSAGE STUFFING MACHINE.
No. 11,317. Reissued Mar. 28, 1893.
FIG. 1.
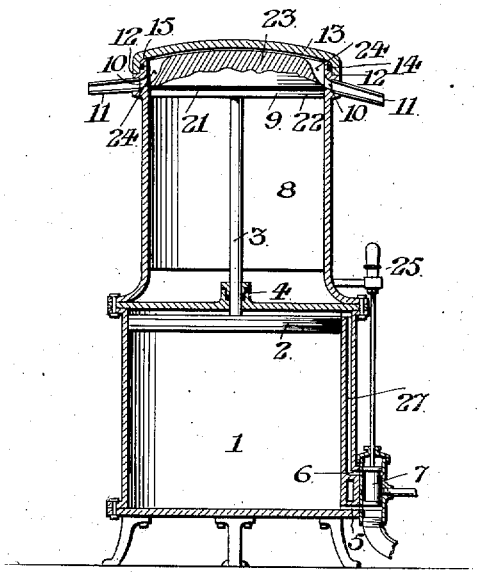
FIG. 2.
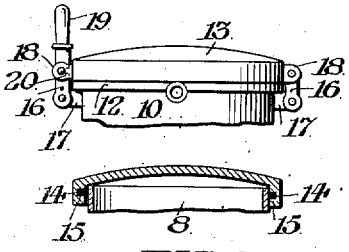
FIG. 4.
FIG. 3.
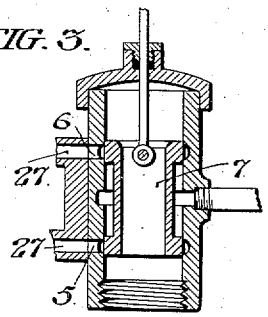
WITNESSES:
A. E. Paige
Sam. Wright
INVENTOR
John Eppler
by Lloyd Wiegand
atty

UNITED STATES PATENT OFFICE.

JOHN EPPLER, OF PHILADELPHIA, PENNSYLVANIA.

SAUSAGE-STUFFING MACHINE.

SPECIFICATION forming part of Reissued Letters Patent No. 11,317, dated March 28, 1893.

Original No. 485,576, dated November 1, 1892. Application for reissue filed February 8, 1893. Serial No. 461,525.

*To all whom it may concern:*

Be it known that I, JOHN EPPLER, a citizen of the United States, residing at Philadelphia, in the county of Philadelphia and State of Pennsylvania, have invented certain new and useful Improvements in Sausage-Stuffing Machines; and I do hereby declare the following to be a sufficiently full, clear, and exact description thereof as to enable others skilled in the art to make and use the said invention.

This invention relates to machines for stuffing sausage meat into casings or skins, and has for its object the simpler construction and greater ease and celerity of operation, and to this end embraces the steam-operated piston and cylinder, and valve for controlling the flow of steam, and a conveniently opened and closed cylinder for containing the meat, from which it is expressed through suitable tubes by the motion of a piston connected with the steam-operated piston.

The construction and operation of this invention is fully hereinafter described and shown in the accompanying drawings, in which—

Figure 1 shows a vertical sectional elevation of a machine embodying this invention; Fig. 2, a side elevation of the cover and upper portion of the meat-cylinder; Fig. 3, an enlarged vertical section of the steam-distributing valve, and Fig. 4 a modification of the cover.

1 represents the steam-cylinder, having a piston 2 fitted therein with a rod 3 passing upwardly through a stuffing-box 4 in the upper head. Steam is admitted upon the upper and lower side of the piston 2 through ports 5 and 6, and channels 27 from a valve 7, which is preferably of the balanced piston type, and so located as to automatically drain the bottom of the cylinder from water of condensation. The valve 7 is operated by a lever-handle 25. Above the cylinder 1 is secured a smaller cylinder 8, in which is fitted a piston 9, attached to the upper end of the piston-rod 3. At a small distance below the top of the cylinder 8 are openings, to which are fitted tubes 11, upon which the sausage-casings are placed to receive the charges of meat. Above the openings 11 is a flange 12, upon which the lower edge of the cover 13 rests. The interior of the rim of the cover 13 is turned truly circular and fits upon an expansible packing-ring 14, let into a groove 15 in the external surface of the cylinder 8 above the openings 11. The lower inside edge of the cover 13 is slightly chamfered or beveled, so as to facilitate closing it upon the cylinder 8 and packing-ring 14.

The cover 13 is secured by links 16, pivotally connecting it with lugs 17, formed on the cylinder 8, and lugs 18, formed in the cover 13.

In order to expedite the opening and closing the cover 13, a handle 19 is attached to the link 16 upon one side of the cover 13 and the link 16 upon that side has a notch 20 cut into it sidewise, so as to easily disengage that side of the cover 13 and permit it to be swung upon the links on the opposite side for the purpose of opening it to introduce charges of meat and to permit of access for cleaning.

The piston 9 is made with an expansible packing 21, held between the plate or spider 22 and the follower 23. The follower is formed in such shape as to fit the space above the packing ring 21, when the piston is at its greatest height, and the under side of the cover 13, and has two grooves 24 formed in it to permit the meat to pass to the openings 10 when the piston 9 is near the upper part of its stroke.

This form of steam-stuffing machine affords easiest access for charging and cleansing, involves fewest working parts, and permits of working by two attendants, one upon each side of the machine, without requiring either to work left handed.

Having described my invention, what I claim is—

In a sausage stuffing machine the cylinder 8, provided with the cover 13 openings 10 and meat tubes 11, and the cylinder 1, separated by a partition having a stuffing box 4 therein, the cylinder 1 having steam ports 5 and 6, and a steam channel 27, and fitted with a piston 2, attached to one end of the piston rod 3 working through the stuffing box 4, in combination with the piston 9 attached to the opposite end of the piston rod 3, and fitted to work in the cylinder 8, and having grooves 24 located in the same vertical plane with the openings 10, through which meat is forced into the meat tubes 11, when the pistons 2 and 9 are raised, substantially as shown and described.

JOHN EPPLER.

Witnesses:
L. M. BLACKWELL,
C. R. MORGAN.